United States Patent
Bokovoy

[15] 3,706,350
[45] Dec. 19, 1972

[54] FULLY AUTOMATIC LOCKING INTERAXLE DIFFERENTIAL FOR TANDEM VEHICLES

[72] Inventor: Ronald D. Bokovoy, Detroit, Mich.
[73] Assignee: Boise Cascade Corporation, Boise, Idaho
[22] Filed: Dec. 9, 1970
[21] Appl. No.: 96,569

Related U.S. Application Data

[63] Continuation-in-part of Ser. No. 30,851, April 22, 1970, abandoned.

[52] U.S. Cl. ............................................. 180/24.09
[51] Int. Cl. ............................................. B62d 61/04
[58] Field of Search .......................... 180/24.09, 23

[56] References Cited

UNITED STATES PATENTS 2,667,087   1/1954   Myers ............................. 180/23 X
3,388,760   6/1968   Christie .......................... 180/24.09
3,451,496   6/1969   Myers ............................. 180/23

*Primary Examiner*—Drayton E. Hoffman
*Assistant Examiner*—George F. Abraham
*Attorney*—Donnelly, Mentag & Harrington

[57] ABSTRACT

An interaxle differential mechanism adapted to deliver torque from a driving shaft to the rear axles and the rear-rear axles of a tandem drive vehicle wherein provision is made for distributing the torque to the rear-rear axles and the rear axles without incurring individual rear-rear axle spin-out or forward-rear axle spin-out, and wherein provision is made also for automatically disconnecting from the driveline either the rear axles or the rear-rear axles when a tendency exists for one or both rear axles or one or both rear-rear axles to overrun due to turning maneuvers.

8 Claims, 10 Drawing Figures

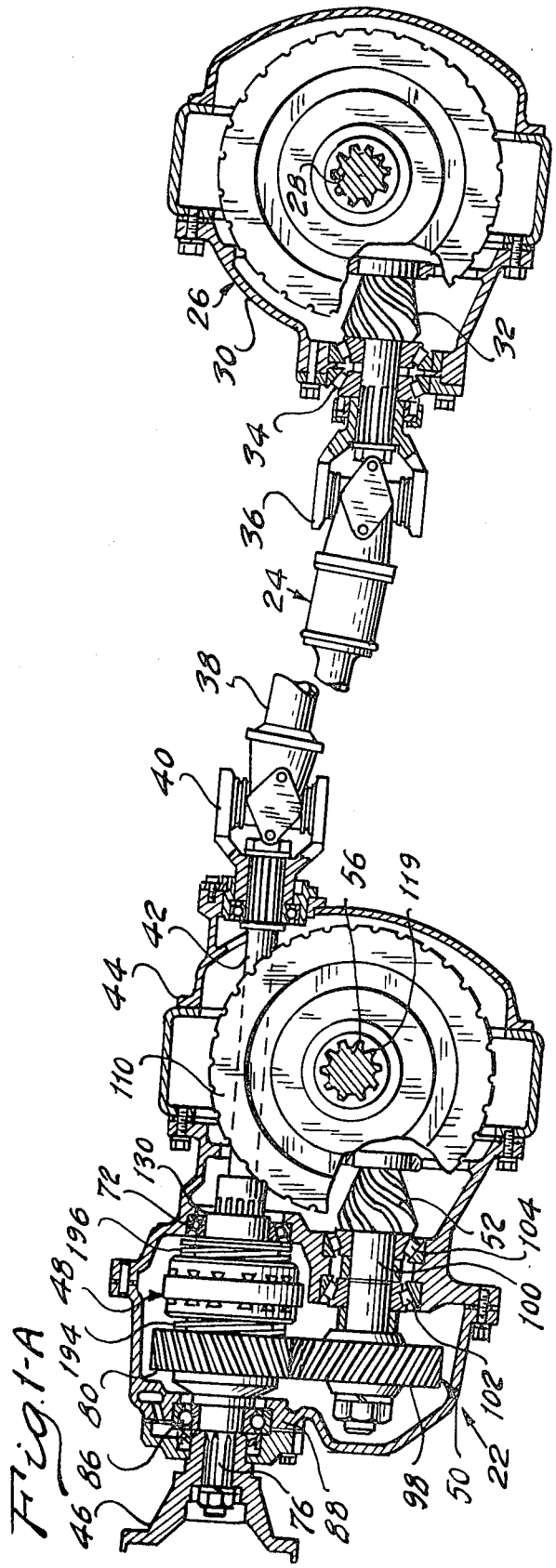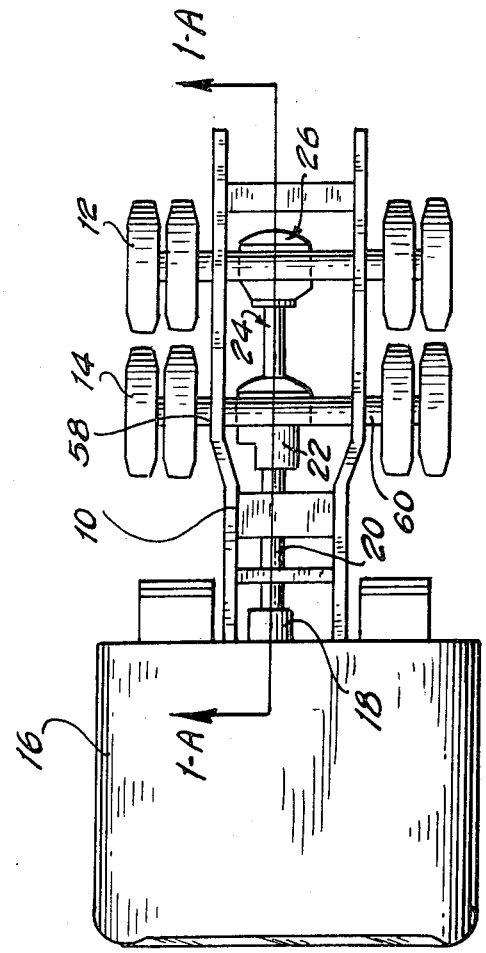

INVENTOR:
RONALD D. BOKOVOY

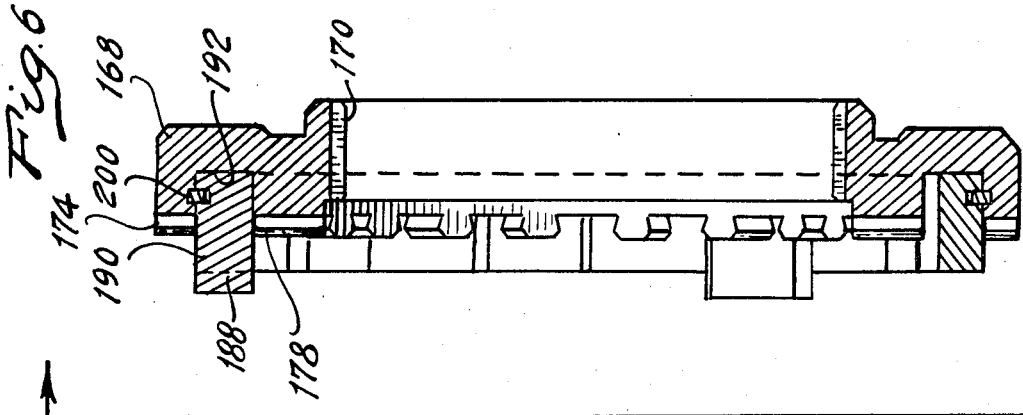

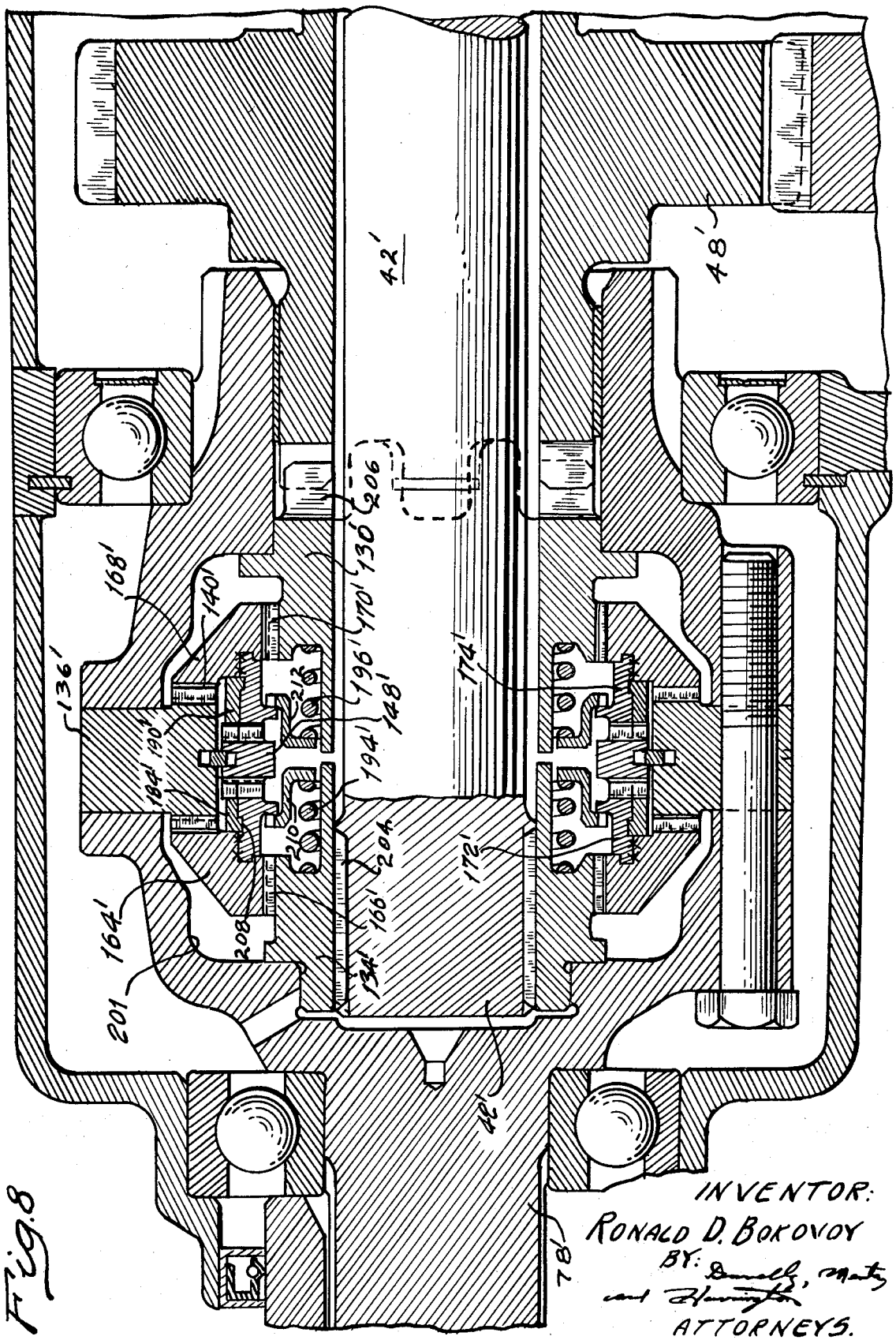

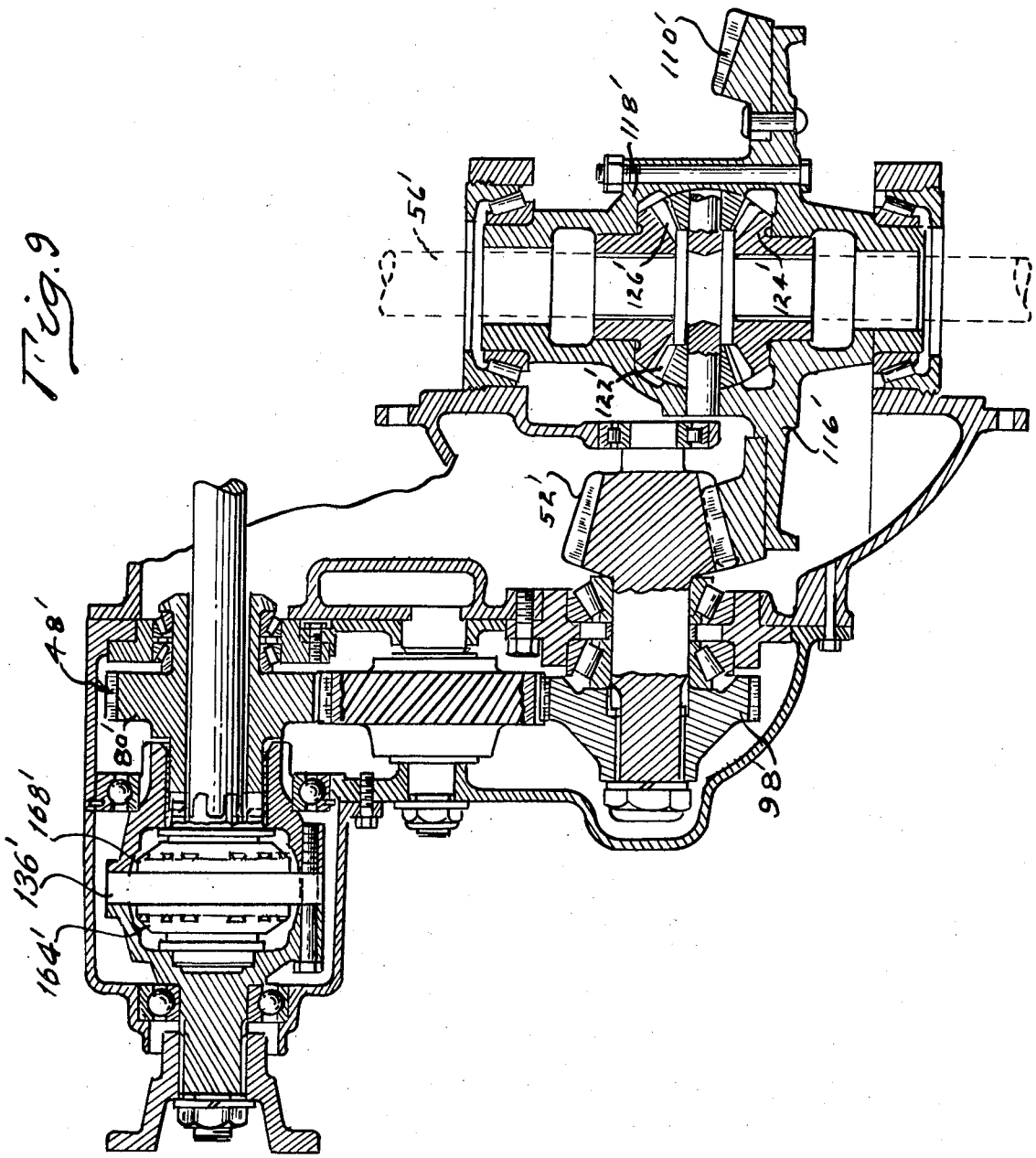

FULLY AUTOMATIC LOCKING INTERAXLE DIFFERENTIAL FOR TANDEM VEHICLES

GENERAL DESCRIPTION OF THE INVENTION

This is a continuation-in-part of application, Ser. No. 30,851 filed Apr. 22, 1970 now abandoned.

The improvements of my invention are adapted to be used especially in the driveline for a tandem drive vehicle wherein torque is delivered from an engine through a multiple ratio power transmission mechanism to the input side of an interaxle differential assembly. Torque is delivered then from the two output elements of the interaxle differential to each of two input pinions for a rear differential mechanism and a rear-rear differential mechanism. The two rear axles for the driveline are connected respectively to the two output elements of the rear differential mechanism and the two rear-rear axles are connected respectively to the two output elements of the rear-rear differential mechanism.

When a vehicle employing such a tandem drive undergoes forward turning maneuvers, the forwardmost of the tandem drive axles must travel faster than the rearmost tandem axles. The interaxle differential thus must function to permit such an overrunning action to occur. Certain prior art tandem axle drivelines have been used to accomplish this overrunning action, but difficulty has been experienced with such known tandem drive differential arrangements when either of the forward-rear or the rear-rear drive axles experiences a loss of traction. Such mechanisms provide differential axle speeds due to cornering of the vehicle or due to differences in tire size, but they are incapable of preventing individual rear-rear axle spin-out or forward-rear axle spin-out. If one or both of the rear-rear axles overspins with respect to the forward-rear axles, one of the output elements of the interaxle differential will remain stationary and the gearing used to connect that interaxle differential output element to the forward-rear axles remains stationary as the other output element of the interaxle differential overspins. This results in premature wear of the torque delivery gear elements in the differential assembly, which is due in part to loss of lubrication of the bearings and the meshing gear teeth. Lubrication depends upon continued motion of the gear elements in the common housing.

A typical design expedient that has been used in an effort to overcome this problem consists in the use of a mechanical "lock-up" dog clutch for connecting directly the torque delivery elements of the interaxle differential mechanism so that its differential functions cease as all of the elements of the interaxle differential rotate in unison. In this way, torque delivery paths to each of the axles, namely the rear-rear axles and the forward-rear axles, are maintained. Differential motion between the axles, however, is not possible under these conditions. Such clutch mechanisms are operated by the vehicle operator usually by means of a pneumatic shifting mechanism. The operator will trigger such a pneumatic mechanism when he observes the rearmost axles in a spin-out condition. If this observation is not made quickly, and the overspinning condition exists even for a relatively short time, bearing or gear failures will occur, thereby resulting in a costly maintenance problem. A dog clutch locking mechanism of this type may be seen by referring to prior art U.S. Pat. No. 3,388,760.

My improved interaxle differential driveline overcomes problems associated with known tandem drivelines by accomplishing a torque delivering condition of the rear-rear axles with respect to the forward-rear axles, and vice versa, without the necessity for a driver decision. This occurs automatically and independently of the driver, and it is dictated by the particular traction conditions encountered. There is no necessity for use of complex pneumatic servos for actuating a clutch lock-up device or the like.

My improved interaxle driveline will make certain that the gearing elements of the differential assemblies will be operative at all times to deliver power. Continued motion of the torque delivery elements assures continuous lubrication of the rotating elements and maintenance problems are substantially reduced for this reason.

If one or both of the rear-rear axles should lose traction with respect to the forward-rear axles, my improved interaxle differential design will permit continuation of torque delivery to the forward-rear axles and will not permit spin-out through the interaxle differential. This action occurs automatically regardless of whether the loss of traction of the rear-rear wheels is a transient condition or is a condition that will continue for a period of time. As soon as traction is restored, the speed of rotation of the rear-rear axles being in synchronism with respect to the speed of rotation of the forward-rear axles, no impact loads are generated to the driveline and the tandem drive condition automatically prevails. This also is done without the necessity for a driver decision.

In some tandem axle driveline environments it is possible to use a positive drive differential between the interaxle differential and the rear axles. If a conventional locking differential is used at this location, the friction torque bias inherent in it may have an adverse influence on vehicle steering. This may be corrected readily by using the automatically operating locking differential of my invention in place of a conventional friction torque bias locking differential for the rear axles. This minimizes the interference with steering performance since the axle associated with the outermost wheel for the rear axles during a turning maneuver then will overrun the other, thus avoiding a torque feedback which could affect steering in certain tandem drivelines.

GENERAL DESCRIPTION OF THE FIGURES OF THE DRAWINGS

FIG. 1 is a plan view in schematic form showing a vehicle with a tandem axle driveline adapted to incorporate the improvements of my invention.

FIG. 1A is a schematic assembly view of the driveline for the vehicle of FIG. 1.

FIG. 6 is a subassembly view showing one cam ring, which forms a part of the mechanism of FIG. 3. It is taken along the plane of section line 6—6 of FIG. 7.

FIG. 7 is a view taken along the plane of section line 7—7 of FIG. 6.

FIGS. 8 and 9 are views corresponding respectively to FIGS. 2 and 1A, showing a second embodiment of the invention.

PARTICULAR DESCRIPTION OF THE INVENTION

Figure 2:
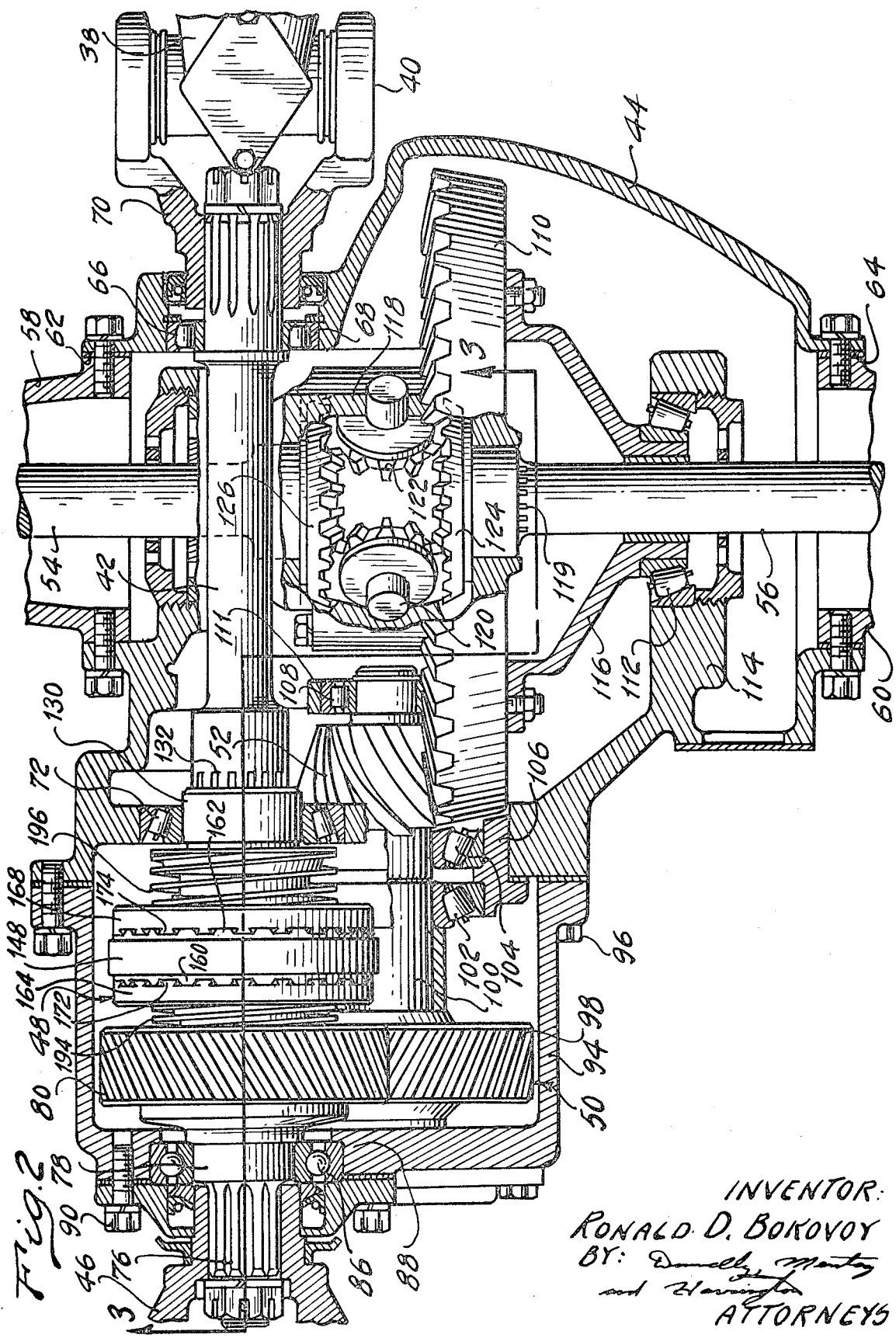
FIG. 2 is a cross sectional view of my improved interaxle differential driveline illustrated schematically in FIG. 1 as seen from section line 2—2 of FIG. 3.

I have shown in FIG. 1 a schematic plan view of a truck chassis having a frame 10, rear traction wheels 12 and auxiliary rear traction wheels 14. An engine, not shown, is located below the driver's compartment 16. Torque from the engine is distributed through a transmission 18 to drive shaft 20, the latter forming a power input element for a tandem lock interaxle differential 22. The output shaft for the interaxle differential 22, which is shown at 24, forms a power input element for a rear-rear differential assembly 26.

The differential 26 includes a pair of side gears, one of which is connected to each of the axles for the traction wheels 12.

The complete tandem axle driveline is illustrated in FIG. 1A. It includes a pair of driven axles, the rearmost of which is shown at 28. A differential housing 30 encloses the differential ring gear, the differential side gears and the differential pinions, which form a driving connection between a power input pinion 32 and the axle shafts 28. Such a differential mechanism may be seen, for example, in U.S. Pat. No. 2,870,854.

Pinion 32 is journaled by means of double taper roller bearings 34 in a portion of the housing 30. A universal joint 36 forms a driving connection between the pinion shaft 32 and drive shaft 38, the other end of the drive shaft being connected by means of universal joint 40 to cross shaft 42. The forward drive axle housing 44 is provided with openings for receiving bearings which journal shaft 42. This has been shown more particularly in FIG. 3.

Drive flange 46 on the forward drive axle assembly is connected drivably to the engine crankshaft. Torque delivered to the drive flange 46 is distributed through an interaxle differential mechanism 48 with a portion of the torque being distributed through the shaft 42 and the balance of the torque being distributed through torque transfer gearing 50 to power input pinion 52 for the forwardmost rear driving axle assembly. This also will be described more particularly with reference to FIG. 3.

The housing 44 encloses a differential ring gear carried by a differential carrier within which is journaled a pair of differential side gears and planet pinions. The forward-rear axle may be similar to the one shown in U.S. Pat. No. 3,388,760, insofar as the disposition of the side gears, planet pinions and the carrier is concerned. The torque applied to the power input pinion 52 is distributed through the differential gearing to each of the two forward-rear axles in the tandem axle driveline.

In FIG. 2, the two forwardmost drive axle shafts are identified by reference characters 54 and 56, each of which is enclosed within an axle housing as seen at 58 and 60, respectively. Housing 44 is formed with an opening 62 which receives the inboard end of the axle shaft housing 58. A similar opening 64 is formed in the opposite side of the housing 44 for receiving the inboard end of the axle shaft housing 60.

The cross shaft 42 is journaled by means of bearing 66 located in bearing opening 68 formed in housing 44. The universal joint 40 includes a drive flange 70, which is splined to the outboard end of the shaft 42.

The left hand end of the cross shaft 42 is journaled by means of tapered roller bearings 72 within an opening formed in a bearing support wall portion of the housing 44.

Drive flange 46 is connected by means of a spline 76 to power input shaft 78 for the interaxle differential 48. Torque transfer gear 80 is connected directly to one output member of the interaxle differential 48 and drive sleeve 130 is connected directly to the other output member of the interaxle differential 48. Sleeve 130 in turn is splined at 132 to the cross shaft 42. Both the shaft 42 and the sleeve 130 are journaled by the bearings 72.

Input shaft 78 (FIG. 3) is journaled by means of a bearing 86 within housing portion 94, which is connected by bolts 90 to bearing plate 88 which forms a part of the housing portion 94 of the interaxle differential. Housing portion 94 in turn is secured to the forward drive axle differential housing 44 by means of bolts 96 (FIG. 2).

The gear 80 meshes directly with torque transfer gear 98. This is connected directly to pinion shaft 100, which drives pinion 52. Shaft 100 is journaled by tandem tapered roller bearings 102 and 104 in a bearing support ring 106. The outboard end of the pinion 52 is journaled by a bearing 108 received within an internal bearing wall 111 which forms a part of the housing 44. This is best seen by referring to FIG. 3. It is this same bearing support wall 111 which provides a bearing support for bearing 72 for the interaxle differential 48.

Pinion 52 engages ring gear 110 (FIG. 2) which is journaled by means of bearing 112 in internal bearing support wall 114. Drive shell 116 supports at its outermost ends ring gear 110. Its innermost end is journaled within the bearing 112. Ring gear 110 is connected directly to differential carrier 118 which supports four equally spaced pinion shafts 120. A pinion 122 is journaled rotatably on each pinion shaft 120. Each pinion engages side gears 124 and 126. Shaft 54 is connected directly to the side gear 126 and shaft 56 is connected directly at 119 to the side gear 124.

Shaft 42 is provided with an opening (FIG. 3) at its inboard end and the inboard end of shaft 78 is journaled within the opening of the shaft 42. A suitable bushing 128 is situated between these two shaft ends.

A first drive sleeve 130 is splined at 132 to the shaft 42. A second drive sleeve 134 is connected drivably to the gear 80. These drive sleeves act as power output elements for the interaxle differential 48. A drive hub 136 is splined at 138 to the shaft 78, the latter serving as a power input member. Driving member 140 (FIG. 4) surrounds the hub 136 and is splined directly to the hub 136, the latter being formed with external spline teeth which mesh with internal spline teeth formed on the driving member 140. A snap ring 142 prevents axial displacement of the driving member 140 with respect to the hub 136 after the two parts are assembled. A snap ring groove for ring 142 is formed in the spline teeth for each of these members 136 and 140.

Figure 5:
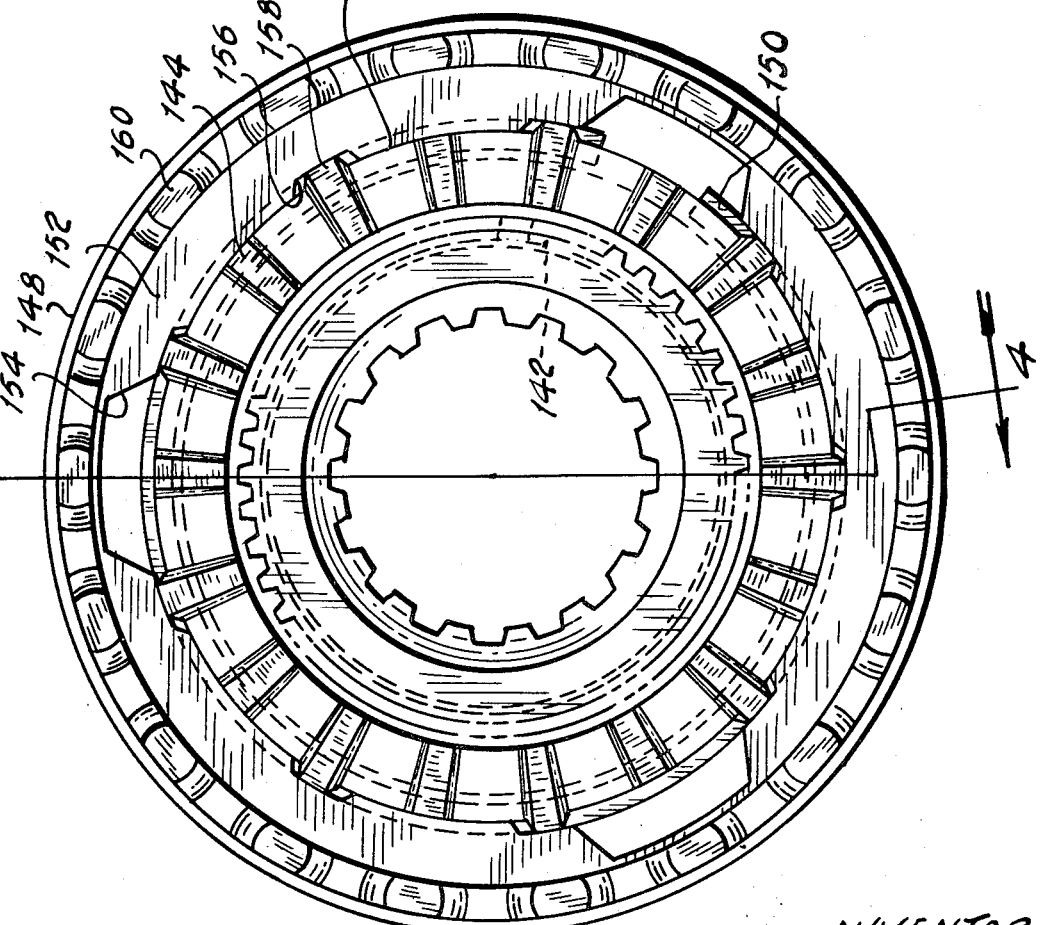
FIG. 5 is a view as seen from the plane of section line 5—5 of FIG. 4.

On each axially disposed side of member 140 there is formed radial clutch teeth 144 which are best indicated in FIG. 5. The teeth 144 extend radially outwardly from the outside diameter circle 146 of the member 140. The sides of the teeth 144 are chamfered, as indicated. A cam ring 148 surrounds the member 140. A snap-ring 150, located in a peripheral snap-ring groove in the outer diameter portion of member 140, engages the inner diameter surface of member 148 and restrains axial displacement of ring 148 with respect to the member 140.

The cam ring 148 has a generally T-shaped cross section. The body portion of the ring 148, which is best indicated in FIG. 5 by reference character 152, is formed with a plurality of angularly spaced recesses 154. The center portion 152 of the cam ring 148 is formed with a plurality of internal slots 156 which receive external projections or keys 158 formed on alternate keys or teeth 144. A limited degree of rotary adjustment of the ring 148 with respect to the member 140 is accommodated by the keys 158, since these are narrower in peripheral extent than the corresponding dimension of the slot 156.

Cam teeth 160 and 162 (FIG. 4) are formed on either side of the cam ring 148. The sides of the cam teeth 160 and 162 are chamfered, as indicated in FIG. 5.

Figure 3:
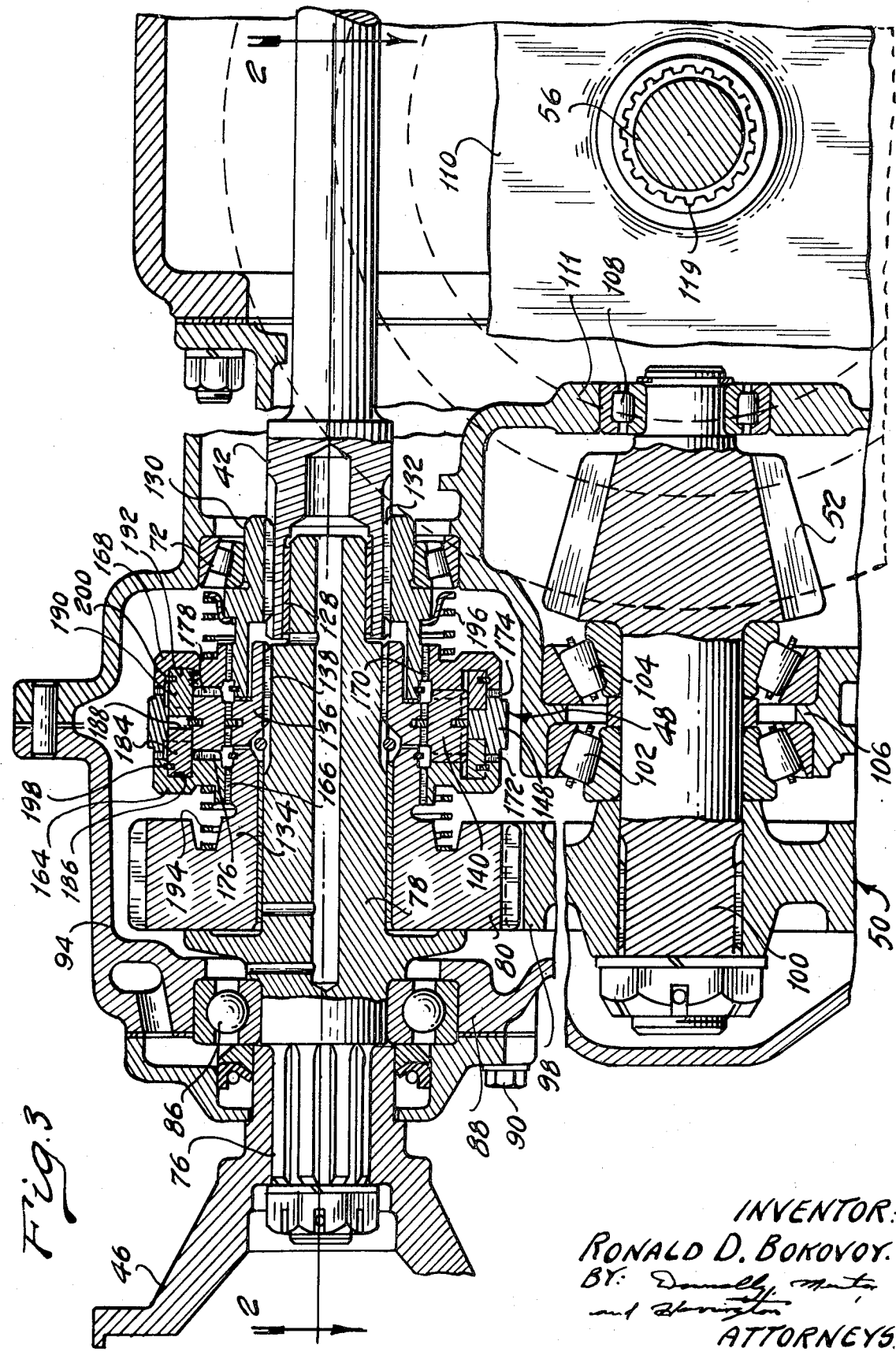
FIG. 3 is a cross sectional view of the interaxle differential of FIG. 2 as seen from section line 3—3 of FIG. 2.

A clutch ring 164 (FIG. 3) is splined to the sleeve 134 as shown at 166. The spline 166 will permit axial adjustment of the clutch element 164 with respect to the gear 80 but relative rotation between these parts is prevented. Similarly, a clutch element 168 is splined at 170 to the sleeve 130. The outer peripheral margin of clutch elements 164 and 168 are formed with clutch teeth 172 and 174, respectively. These teeth are adapted to register with cam teeth 160 and 162 (FIG. 4), formed on the cam ring 148. Clutch ring 164 is formed also with radial, inwardly positioned teeth 176, as indicated in FIG. 3. These may be similar in shape to the teeth 172 and 174 and they form continuations of the teeth 172. Similarly, as shown in FIGS. 6 and 7, clutch ring 168 is formed with clutch teeth 178 which are similar in shape to teeth 172 and 174. They may be formed as continuations of the teeth 174.

Figure 4:
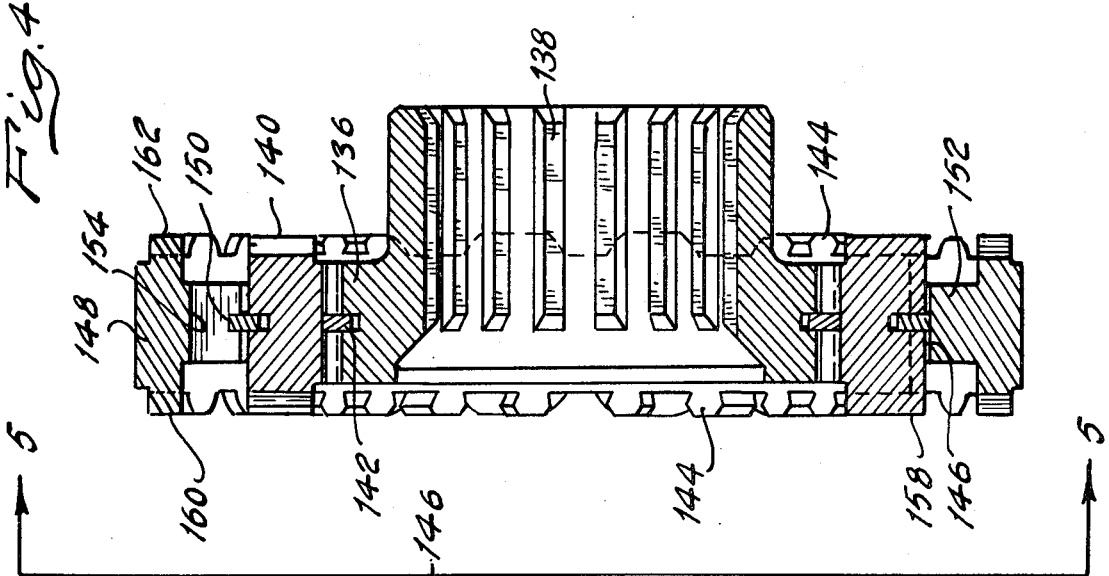
FIG. 4 shows a subassembly view of the torque input portion of the differential shown in FIG. 3. It is taken along the plane of section line 4—4 of FIG. 5.

As best seen in FIG. 4, teeth 144 are formed on either axial side of the member 140. These teeth register respectively with the clutch teeth 176 and 178 formed in the clutch rings 164 and 168. The sides of the teeth 144 are dovetailed to permit locking engagement with the dovetailed sides of the teeth 176 and 178 so that the teeth will become locked together when torque is being transmitted between the clutch elements and the member 140.

A clutch hold-out ring 184 (FIG. 3) is received within an annular groove 186 in the clutch ring 164. It is formed with internal slots on its inner periphery, which register with the keys 158 formed at the radially outward ends of the teeth 144. One axial end of the hold-out ring 184 is formed with lugs 188, which are each received within an adjacent slot 154 formed in the cam ring 148. A second hold-out ring 190 is received within an annular groove 192 formed in the clutch member 168. It also is formed with internal slots which register with the lugs 158. These rings 184, 190 are formed also with lugs shown at 188, which register with the slots 154 in the cam ring.

The clutch element 164 is urged normally into clutching engagement with the members 140 by means of a clutch spring 194. In a similar fashion clutch spring 196 urges clutch element 168 into clutching engagement with the member 140.

When torque is delivered to the shaft 78, it is distributed through the spline 138 to the hub 136. When the clutch teeth are in locking engagement, the torque then is transferred from hub 136 to the members 140 and to each clutch element 164 and 168. From there the torque is transmitted to each drive sleeve 134 and 130. If drive sleeve 134 tends to be overridden with respect to drive sleeve 130, the cam teeth 160 (FIG. 4) will ride over the teeth 172, thereby causing the clutch teeth 144 and 176 to disengage. The hold-out ring 184 then will be shifted relative to the member 140 so that the lugs 188 will move out of registry with the slot 154 and engage the radially inward portion 152 of the cam ring 148. The presence of the hold-out ring 184 between the clutch element 164 and the member 140 will prevent the clutch teeth 144 and 176 from drivably engaging each other. The gear 80 then is disconnected from the shaft 78 so that the former can rotate freely relative to the shaft 78. All the torque delivered from the shaft 78 to the interaxle differential then will be distributed through the engaged clutch teeth for clutch element 168 to the drive sleeve 130.

If differential motion ceases, the hold-out ring 184 then will be moved again into registry with the slots 154 as the gear 80 and the sleeve 134 then are allowed to rotate in synchronism with the rotary motion of the member 140. Clutch element 164 then will again snap into clutching engagement under the influence of the clutch spring 194 so that a driving connection then is restored between the shaft 78 and the gear 80.

If differential motion in the opposite direction should occur, clutch element 168 will be moved out of clutching engagement with the member 140 thereby disconnecting drive sleeve 130 from the shaft 78. Hold-out ring 190 in these circumstances is moved out of registry with the slots 154. The lugs 188 then engage the radially inward portions 152 of the cam ring 148 so that the teeth 144 continue to be disengaged.

Relative angular motion of the hold-out rings relative to the member 140 is limited because of the registering relationship between the keys 158 and the internal recesses formed in the hold-out rings. Each hold-out ring has a snap-ring groove in which is situated a snap-ring as shown at 198 and 200. This creates a limited amount of drag between the snap-rings and the respective clutch elements so that a change in the speed of rotation of the clutch element will result in a corresponding change in speed of the associated hold-out ring. This permits the hold-out ring to move into registry with its cooperating slot 154 when synchronism is achieved between the gear 80 and the sleeve 130 following freewheeling motion with respect to the member 140.

If the driver should experience a loss of traction at the rear-rear axles, a greater percentage of the torque of the engine will be distributed through the torque transfer gears 80 and 98.

Similarly, a greater percentage of the torque delivered from the engine then will be delivered directly to the rear-rear axles until a traction loss at the forward rear axle again is restored.

During turning maneuvers, differential action will occur at the interaxle differential. A right-turn or left-turn while the vehicle is moving in a forward or reverse direction will result in disengagement of the clutch teeth for clutch element 164 or 168, as appropriate. This is due to the fact that the forwardmost driving axles rotate through a greater arc than the wheels for the rear-rear axles. The forwardmost driving axle than is temporarily disengaged during the turning maneuver as torque is delivered to the rearmost axles. This prevents tire scuffing and improves roadability during turning maneuvers.

The action of the interaxle differential tandem-lock function occurs automatically and there is no need for driver intervention. There is no possibility therefore of a mechanical failure due to driver error.

All the gear elements in the interaxle differential assembly rotate during operation regardless of whether at any given instant they are delivering torque. Continuous lubrication then is available to each lubrication point in the system including bearings and the various pinion and gear meshes. Mechanical failures due to loss of lubrication then are avoided.

If only one of the wheels for the rear-rear axle should lose traction, rear axle spin-out still will not occur because, even under these conditions, the cross shaft 42 will be driven with respect to shaft 78. Torque then is distributed to the rear axles until the necessary traction is regained.

The same circumstances prevail if one of the forward rear axle wheels tends to lose traction.

In FIGS. 8 and 9 I have illustrated a second embodiment of my invention wherein the torque transfer gears which form a connection between the output element of the interaxle differential and the forwardmost rear driving axle assembly, are situated on the torque output side of the interaxle differential assembly 148'. Many of the elements of the embodiment of FIGS. 8 and 9 are common to the embodiment of FIGS. 1 through 7, and for this reason similar reference characters are used in designating the elements, although prime notations are added.

In FIG. 8 reference character 201 indicates an interaxle differential axle case which is connected directly to the power input shaft 78'. Hub 136', which forms a counterpart for the driving hub 136 of the first embodiment, includes radial stub-shafts which are received within radial apertures formed in the case 201. Hub 136' may be connected integrally to driving member 140' which is formed with clutch teeth on either axial side thereof. These clutch teeth engage clutch teeth formed in clutch members 164' and 168', which in turn are splined at 166' and 170', respectively, to the side members 134' and 130'. Shaft 42' extends through the interaxle differential assembly and is splined at 204 to the side member 134'. Side member 130' is formed with dog teeth 206 which register with cooperating dog teeth formed on the torque transfer gear 48'.

The cam teeth located at the radially outward region of the clutch assembly of the embodiment of FIGS. 1 through 7 are located in the embodiment of FIGS. 8 and 9 on the cam rings 174'. This is secured by brazing to or is integral with the clutch member 164'. It is formed with an external peripheral groove within which is positioned a retainer ring 208 on a hold-out ring 184'. The hold-out ring is a circular, split ring which functions as a snap ring as well as performing the functions of the hold-out ring 184 described with reference to the embodiments of FIGS. 1 through 7. Cam ring 148' is located directly within the member 136' and is formed with cam teeth which register with the cam teeth on the rings 172' and 174'.

Spring retainers 210 and 212 are located within the cam rings 172' and 174' to support springs 194' and 196' which urge the cam rings into meshing engagement with the cooperating cam teeth formed on the cam ring 148'.

The mode of operation of the embodiment of FIG. 8 is similar to the mode of operation of the embodiment of FIGS. 1 through 7, although the relative dispositions of the cam rings and clutch teeth are interchanged.

Having described a preferred form of my invention, what I claim and desire to secure by U.S. Letters Patent is:

1. A tandem axle driveline for road vehicles comprising, a pair of rear-rear axles, a pair of rear axles, a drive shaft connecting said axles, a first differential assembly connecting one end of said drive shaft to each of said rear-rear axles including differential gearing having an input member connected to said drive shaft and two output members connected respectively to said rear-rear axle shafts, a second differential assembly having a power input element and two power output elements connected respectively to each of said rear axle shafts, an interaxle differential assembly having a power input member, a common housing for said interaxle differential assembly and said second differential assembly having separate portions enclosing each, drive gearing adjacent said interaxle differential assembly in the housing portion for the latter, said interaxle differential assembly having a pair of output elements, one of said interaxle differential output elements being connected drivably through said drive gearing to the power input element of said second differential assembly, the other interaxle differential output element being concentric with said power input member of said interaxle differential assembly and connected to the other end of said drive shaft, a first clutch member connected drivably to the power input element for said interaxle differential, a pair of output clutch elements with registering clutch teeth connected respectively to the torque output elements of said interaxle differential assembly, and cam means for selectively disengaging each of said pair of clutch elements from said input clutch member comprising registering cam parts carried by each of said clutch elements and by said input clutch member whereby the clutch teeth of one clutch element and said input clutch member are moved out of engagement when a tendency exists for an associated axle shaft to overrun.

2. A tandem axle driveline for road vehicles comprising, a pair of rear-rear axles, a pair of rear axles, a drive shaft connecting said axles, a first differential assembly connecting one end of said drive shaft to each of said rear-rear axles including differential gearing having an input member connected to said drive shaft and two output members connected respectively to said rear-rear axle shafts, a second differential assembly having a power input element and two power output elements connected respectively to each of said rear axle shafts, an intertaxle differential assembly having a power input member, a common housing for said interaxle differential assembly and said second differential assembly having separate portions enclosing each, drive gearing adjacent said interaxle differential assembly in the housing portion for the latter, said interaxle differential assembly having a pair of output elements, one of said interaxle differential output elements being connected drivably through said drive gearing to the power input element of said second differential assembly, the other interaxle differential output element being concentric with said power input member of said interaxle differential assembly and connected to the other end of said drive shaft, a first clutch member connected drivably to the power input element for said interaxle differential, a pair of output clutch elements connected respectively to the torque output elements of said interaxle differential assembly, and means for selectively disengaging each of said pair of clutch elements from said input clutch member comprising registering parts carried by each of said clutch elements and by said input clutch member whereby an output clutch element and said input clutch member are moved out of engagement when a tendency exists for an associated axle shaft to overrun.

3. The combination set forth in claim 1 wherein each differential assembly comprises a power input pinion, a ring gear, a pair of side gears, one side gear being connected to one of the associated axle shafts and the other side gear being connected to the other of the associated axle shafts, a carrier connected to said ring gear, and planet pinions carried by said carrier in meshing engagement with each of said side gears.

4. The combination set forth in claim 1 wherein the other output element of said interaxle differential assembly comprises a cross shaft disposed transversely with respect to the axis of said rear axles and having one end thereof connected drivably to said other end of said drive shaft whereby the torque delivered to said interaxle differential is divided between the rear-rear axles and the rear axles when the motions of the rear-rear axles and the rear axles are in synchronism.

5. The combination as set forth in claim 1, wherein the other output element of said interaxle differential assembly comprises a cross shaft journaled in said common housing in a direction parallel to the axis of rotation of the power input member of said interaxle differential assembly, said cross shaft being connected through said drive shaft to power input portions of said first differential assembly.

6. The combination as set forth in claim 3, wherein the other output element of said interaxle differential assembly comprises a cross shaft journaled in said common housing in a direction parallel to the axis of rotation of the power input member of said interaxle differential assembly, said cross shaft being connected through said drive shaft to power input portions of said first differential assembly.

7. The combination as set forth in claim 4, wherein said cross shaft is journaled in said common housing in a direction parallel to the axis of rotation of the power input member of said interaxle differential assembly, said cross shaft being connected through said drive shaft to power input portions of said first differential assembly.

8. A tandem axle driveline for use in a wheeled vehicle having an engine, rear-rear traction wheels, a first differential assembly having torque output elements connected to a separate one of said rear-rear traction wheels, a second differential assembly having an input element and two output elements connected to separate ones of said rear axles, an interaxle differential having two output elements and an input element, the input element of said interaxle differential being adapted to be connected to said engine, a geared connection between one output element of said interaxle differential and the input element of said second differential assembly, the input element of said first differential assembly being connected to the other output element of said interaxle differential, disengageable clutch means for drivably connecting the input element of said interaxle differential with each of the output elements thereof, cam means including registering parts connected to said input element of said interaxle differential and each of the output elements thereof for disconnecting the clutch means associated with said one and said other output elements of said interaxle differential when one associated differential output element tends to overrun with respect to another, said second differential assembly and said interaxle differential having a common differential housing, the geared connection between said one output element of said interaxle differential and the input element of said second differential assembly being situated within said common housing, and a cross shaft journaled in said common housing in a direction parallel to the axis of rotation of the power input member of said interaxle differential, and said cross shaft being connected to the other output element of said interaxle differential and to power input portions of said first differential assembly.

* * * * *

UNITED STATES PATENT OFFICE
CERTIFICATE OF CORRECTION

Patent No. 3,706,350      Dated December 19, 1972

Inventor(s) RONALD D. BOKOVOY

It is certified that error appears in the above-identified patent and that said Letters Patent are hereby corrected as shown below:

Column 7, line 8, "than" should be -- then --.
Column 7, line 65, after "rings" insert -- 172' and --.

Signed and sealed this 1st day of May 1973.

(SEAL)
Attest:

EDWARD M. FLETCHER, JR.      ROBERT GOTTSCHALK
Attesting Officer      Commissioner of Patents